(12) United States Patent
Reedy et al.

(10) Patent No.: US 10,954,903 B2
(45) Date of Patent: *Mar. 23, 2021

(54) AIR VELOCITY APPARATUS AND SYSTEM

(71) Applicant: K&N Engineering, Inc., Riverside, CA (US)

(72) Inventors: John Reedy, Rancho Cucamonga, CA (US); Steve Rogers, Murrieta, CA (US)

(73) Assignee: K&N Engineering, Inc., Riverside, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/126,874

(22) Filed: Sep. 10, 2018

(65) Prior Publication Data
US 2019/0003431 A1    Jan. 3, 2019

Related U.S. Application Data

(60) Continuation of application No. 14/300,400, filed on Jun. 10, 2014, now Pat. No. 10,072,620, which is a continuation of application No. 13/346,633, filed on Jan. 9, 2012, now Pat. No. 8,770,011, which is a continuation of application No. 12/421,574, filed on Apr. 9, 2009, now Pat. No. 8,113,036, which is a division of application No. 11/752,826, filed on May 23, 2007, now Pat. No. 7,581,430.

(51) Int. Cl.
*F02M 35/10* (2006.01)
*B01D 46/44* (2006.01)

(52) U.S. Cl.
CPC ..... *F02M 35/10386* (2013.01); *B01D 46/444* (2013.01); *B01D 2273/18* (2013.01)

(58) Field of Classification Search
CPC .............. B01D 2273/18; B01D 46/444; F02M 35/10386
See application file for complete search history.

(56) References Cited

U.S. PATENT DOCUMENTS

| | | | | |
|---|---|---|---|---|
| 3,194,056 A | * | 7/1965 | Hopkins | G01N 15/0826 73/38 |
| 3,304,337 A | * | 2/1967 | Jordan, Jr. | C07C 17/10 570/219 |
| 3,320,792 A | * | 5/1967 | Peranio | G01N 15/0826 73/38 |
| 3,336,793 A | * | 8/1967 | Tuttle | G01M 3/26 73/40 |

(Continued)

*Primary Examiner* — John Fitzgerald
(74) *Attorney, Agent, or Firm* — Rutan & Tucker LLP; Hani Z. Sayed (57) ABSTRACT

An apparatus and a system is provided that may be utilized to determine air flow through an air filter and/or a plurality of air filters. The present invention utilizes a demonstration apparatus to illustrate the differences in air flow and air restriction between a plurality of different air filters and filtration media. The apparatus and system utilizes a common plenum which subjects the plurality of air filters to the same differential pressure. The air flows through a first side of the air filter and is measured on the second side of the air filter by utilizing a wind meter or similar device to gauge the amount of air flow velocity of the second side of the filter. Additionally, the apparatus and system utilizes a display means to illustrate the differing air velocity through the second side of the air filter.

20 Claims, 3 Drawing Sheets

(56) References Cited

U.S. PATENT DOCUMENTS

| | | | | |
|---|---|---|---|---|
| 3,395,514 A * | 8/1968 | Bub | B01D 46/10 | 95/273 |
| 3,473,876 A * | 10/1969 | Steinberg | G01N 21/534 | 356/338 |
| 3,577,710 A * | 5/1971 | Feldman | F24F 3/16 | 96/140 |
| 3,608,379 A * | 9/1971 | Brevko | G01M 13/00 | 73/865.5 |
| 4,014,209 A * | 3/1977 | Emerick | G01L 7/18 | 73/114.31 |
| 4,055,075 A * | 10/1977 | Allan | B01D 46/0013 | 73/40.7 |
| 4,324,568 A * | 4/1982 | Wilcox | B01D 46/0013 | 239/514 |
| 4,384,474 A * | 5/1983 | Kowalski | B01D 35/00 | 73/38 |
| 4,494,403 A * | 1/1985 | Bowers | B01D 46/0006 | 73/40.7 |
| RE31,952 E * | 7/1985 | Wilcox | B01D 46/0004 | 239/514 |
| 4,548,068 A * | 10/1985 | Gualtieri | B01D 46/0005 | 454/297 |
| 4,614,109 A * | 9/1986 | Hofmann | B01D 65/102 | 73/38 |
| 4,646,558 A * | 3/1987 | Gualtieri | B01D 46/0005 | 55/418 |
| 4,676,092 A * | 6/1987 | Tuttle | G01M 3/20 | 73/38 |
| 4,751,501 A * | 6/1988 | Gut | F24F 13/28 | 340/607 |
| 4,784,675 A * | 11/1988 | Leber | B01D 46/00 | 55/385.1 |
| 4,787,922 A * | 11/1988 | Kulitz | B01D 46/002 | 55/356 |
| 4,797,922 A * | 1/1989 | Massey | H04L 9/0668 | 380/46 |
| 4,875,360 A * | 10/1989 | Ziemer | G01M 3/20 | 73/40.7 |
| 5,036,698 A * | 8/1991 | Conti | B01D 46/0086 | 116/DIG. 25 |
| 5,266,495 A * | 11/1993 | Lapidus | C12M 41/36 | 210/87 |
| 5,417,101 A * | 5/1995 | Weich | B01D 29/114 | 73/38 |
| 5,576,480 A * | 11/1996 | Hopkins | B01D 65/102 | 73/38 |
| 5,594,161 A * | 1/1997 | Randhahn | B01D 29/114 | 73/38 |
| 6,334,959 B1 * | 1/2002 | Sutton | B01D 35/143 | 210/767 |
| 6,409,805 B1 * | 6/2002 | Beier | B01D 46/0086 | 95/287 |
| 6,470,740 B2 * | 10/2002 | Li | G01M 9/02 | 73/147 |
| 6,568,282 B1 * | 5/2003 | Ganzi | B01D 65/102 | 73/38 |
| 6,672,134 B2 * | 1/2004 | Bodnar | B01D 46/0086 | 73/28.01 |
| 6,843,106 B2 * | 1/2005 | Swersey | G01N 15/0826 | 73/38 |
| 6,923,911 B1 * | 8/2005 | Beier | B01D 29/012 | 210/273 |
| 6,938,460 B2 * | 9/2005 | Seiler | B01D 65/102 | 210/323.1 |
| 7,186,287 B2 * | 3/2007 | Beier | B01D 46/002 | 55/378 |
| 7,581,430 B2 * | 9/2009 | Reedy | B01D 46/444 | 73/38 |
| 7,637,146 B2 * | 12/2009 | Reedy | B60H 1/00585 | 73/38 |
| 8,028,564 B2 * | 10/2011 | Reedy | B60H 1/00585 | 73/38 |
| 8,113,036 B2 * | 2/2012 | Reedy | B01D 46/444 | 73/38 |
| 8,418,528 B2 * | 4/2013 | Reedy | B60H 1/00585 | 73/38 |
| 8,770,011 B2 * | 7/2014 | Reedy | B01D 46/444 | 73/38 |
| 8,783,092 B2 * | 7/2014 | Reedy | B60H 1/00585 | 73/49.7 |

\* cited by examiner

AIR VELOCITY APPARATUS AND SYSTEM

FIELD OF THE INVENTION

The present invention relates generally to the field of vehicle performance parts. More specifically, the present invention relates to apparatus and system to measure the air velocity through a vehicle air filter.

BACKGROUND OF THE INVENTION

Most commercial and private vehicles have a plethora of parts and necessary elements to make them run properly. A typical vehicle has thousands of moving, functional and essential parts.

For many car enthusiasts, modifying a factory vehicle with upgraded aftermarket parts is rewarding and satisfying in a multiplicity of different ways. Many individuals decide to modify their vehicles for aesthetic purposes. However, many individuals modify or alter their vehicles to elicit better performance from their vehicle or to upgrade from more restrictive parts that come with their vehicle from the factory to less restrictive parts with better usability and/or performance.

There are some very common aftermarket modifications that most vehicle enthusiasts, such as car owners, motorcycle owners, boat, and other gasoline/diesel powered vehicle owners choose to employ. A few of these common aftermarket modifications are replacement of a vehicle exhaust system, and replacement of headers (which are tubes that run from the engine and direct unwanted heat and exhaust away from the engine). Additionally, many individuals will recalibrate a vehicle's computer which regulates engine speed and other functions, to elicit higher performance and tolerances. However, the most common type of vehicle modification is the replacement of the stock air filter with an aftermarket type air filter.

The two main types of air filters that are used in vehicles are the combustion air filter, and the cabin air filter. The cabin air filter is a pleated paper filter that is placed in the outside-air intake for the vehicle's passenger compartment. Some of these filters are rectangular and similar in shape to the combustion air filter. Others are uniquely shaped to fit the available space of a particular vehicle's outside-air intakes. This type of filter is relatively new to the car industry and often gets clogged and dirty. Newer cabin air filters may reduce allergens and may utilize additional compositions to reduce particulates, odors and the like.

The combustion air filters are used in vehicles to prevent abrasive particulate matter from entering the engine. If particulate is allowed to enter the engine, it could cause mechanical problems or contamination of vital fluids needed for proper engine management, including contamination of engine oil.

Most modern, fuel injected vehicles use some sort of pleated paper filter element in the form of a flat panel. This filter is usually placed inside a plastic box connected to the throttle body with a large hose. The filter may stop particulate matter and other contaminates from entering the engine and causing damage or degradation of the engine.

Older vehicles typically are not fuel injected, but rather use carburetors or throttle body fuel injection. These types of vehicles typically use a different air filter, usually only a few inches high and cylindrical in shape. These air filters are positioned above the carburetor or throttle body, usually in a metal or plastic container which may incorporate ducting to provide cooler and/or warmer inlet air, and are secured with a metal or plastic lid.

Most air filters are constructed from similar materials. Traditional prior art air filters are constructed from a pleated paper filter because they are efficient, easy to use and cost-effective. Other air filters are constructed of different materials such as cotton, foam and the like. Aftermarket filters are typically constructed of one and/or a combination of these materials and may allow for more air flow from the outside of the vehicle to the engine, which may increase engine performance while still reducing contaminant intrusion into the engine.

A very large aftermarket presence has arisen from the replacement of the stock factory air filter with a newer, more efficient filter that may allow for increased air flow through the filter and subsequently into the engine. However, many of these aftermarket manufacturers claim that their air filter performs better than another manufacturer's aftermarket air filter, when in fact they may not, or in the alternative, may perform more poorly.

One problem that exists, is that the air flow through an air filter may positively affect performance, but it is difficult to detect from normal use of the vehicle any changes that an aftermarket filter may provide. Additionally, another problem that exists, is that there is no good method or technique to determine which air filter product may be better than a competing air filter product at reducing air restriction through a filter media.

A need therefore exists for an improved apparatus and system to determine the air flow and air restriction through a vehicle air filter. Additionally, a need therefore exists for an improved apparatus and system that may be utilized to determine the air flow through a filter and a system for measuring exiting air velocity from an air filter.

A need also exists for an improved apparatus and system to determine the air flow through a plurality of competing and different vehicle air filters and a system for measuring the air flow through the plurality of air filters. Moreover, a need exists for a system that may compare the air flow through a plurality of different air filters to determine which air filter provides the greatest amount of air flow and the least amount of air restriction through the filters. Lastly, a need exists for a system and apparatus to display the results of the air velocity testing to a viewer.

SUMMARY OF THE INVENTION

The present invention relates to an apparatus and a system that may be utilized to determine air flow and/or air restriction through an air filter. The present invention utilizes a demonstration apparatus to illustrate the differences in air flow and subsequent air velocity between a plurality of different air filters and/or filtration media. The present invention utilizes a common plenum which subjects the plurality of air filters to the same differential pressure. The air flows through a first side of the air filter and may be measured on the second side of the air filter by utilizing a wind meter or similar device to gauge the air velocity and/or air restriction from the second side of the filter. Additionally, the present invention may utilize a display means to illustrate the differing air velocities acquired from the exiting air on the second side of the air filter.

To this end, in an exemplary embodiment the present invention, an apparatus for measuring air flow through a filtration media is provided. The apparatus has a container means by having at least a side, and a top and bottom portion. Additionally, the apparatus has an accommodation portion whereby the accommodation portion has at least one opening thereon for accommodating a filtration media. Moreover, the apparatus has one or more blowers for pressurizing the apparatus resulting in moving air through the air filtration media and at least one anemometer to measure the air flow through the air filtration media.

In an exemplary embodiment, the system has an accommodation portion that holds a plurality of air filtration media.

In an exemplary embodiment, the system has a top plate hinged to the top portion of the container means wherein the top plate may extend away and allow access to the accommodation portion.

In an exemplary embodiment, the system has a plurality of anemometers connected to the accommodation portion.

In an exemplary embodiment, the system has a plurality of anemometers whereby the anemometers collect air flow data from above the air filtration media and report the results of collected information to a viewer.

In an exemplary embodiment, the system has filter media wherein the air filtration media is a vehicle air filter.

In an exemplary embodiment, the system has a container means wherein the container means has at least one transparent portion whereby a viewer may observe the interior portion of the container means.

In an exemplary embodiment, the system has a common plenum to subject the air filtration media to the same differential pressure.

In an exemplary embodiment, the system has a front portion and the top portion of the container means that is constructed of clear plexi-glass.

In an exemplary embodiment, the system has anemometers that measure the total air velocity exiting a plurality of filter media and displays the results of the total air velocity on a display means.

In an exemplary embodiment, the system has an anemometer that is positioned above the air filtration media whereby upon exiting the air filtration media, air velocity data is collected by the anemometer to determine the velocity of exiting air from the air filtration media.

In an exemplary embodiment, the system has a plurality of anemometers that are positioned in substantially the same position on the accommodation portion such that each anemometer is subject to a set of parameters including being subject to the air flow velocity leaving each air filtration media.

In an exemplary embodiment, the system has an accommodation portion that has a plurality of openings thereon to accommodate a plurality of air filtration media whereby the air filtration media is removably placed into the openings and further wherein the air filtration media may be moved from one opening on the accommodation portion to another opening thereon.

To this end, in an exemplary embodiment of the present invention, a system for measuring air velocity is provided. The system has a container means having at least a side, and a top and bottom portion whereby the side and the top portion are transparent. Additionally, the system has a plurality of spaced apart openings on the top portion of the container means and one or more blowers contained within the container means to create air flow. Moreover, the system has a plurality of air filter media placed in the opening on the top portion of the container means and a plurality of wind meters associated with each of the plurality of air filter media.

In an exemplary embodiment, the system has a common plenum contained within the container means to subject all air filters to an equal air pressure.

In an exemplary embodiment, the system has wind meters wherein the wind meters are positioned above the air filter media whereby upon exiting the air filter media, air velocity data is collected by the wind meters to determine velocity of exiting air from the air filter media.

In an exemplary embodiment, the system has wind meters wherein the wind meters display the results of measured air velocity through the air filter media.

In an exemplary embodiment, the system has wind meters wherein the wind meters display the results of the measured air velocity through the air filter media by utilizing a display means.

In an exemplary embodiment, the system may be connected to a terminal whereby the terminal graphically displays and prints a copy of the collected air velocity data from each of the air filter media.

In an exemplary embodiment, the system has a plurality of openings positioned on the top portion of the container means that accommodates a plurality of air filter media whereby the air filter media is removably placed into the plurality of openings and further wherein the air filter media is interchangeable with any of the plurality of openings.

To this end, in an exemplary embodiment of the present invention, an apparatus and system for measuring air velocity is provided.

In another exemplary embodiment, an apparatus and a system for measuring air velocity is provided. The apparatus may be utilized for illustrative purposes.

Another exemplary embodiment is an apparatus and system for measuring air velocity whereby the air velocity exiting an air filter is measured.

Yet another exemplary embodiment of the present invention is to provide an apparatus and a system for measuring air restriction of an air filter.

Still another exemplary embodiment of the present invention is to provide an apparatus and a system for measuring air velocity of a plurality of different air filters.

An exemplary embodiment of the present invention is to provide an apparatus and a system for measuring air velocity through a plurality of air filters whereby the apparatus may hold a plurality of different air filters for measurement of air flow through the plurality of different air filters.

Yet another exemplary embodiment of the present invention is to provide an apparatus and a system whereby the results of the air velocities through a plurality of air filters may be illustrated to a user in graphical form.

Another exemplary embodiment of the present invention is to provide an apparatus and a system whereby the invention may have a common plenum which ensures that all the tested air filters are subject to the same air pressure.

Still another exemplary embodiment of the present invention is to provide an apparatus and a system for measuring air flow through an air filter whereby the apparatus may have a common plenum contained in a container means and/or housing whereby the housing accommodates the plurality of air filters.

Yet another exemplary embodiment of the present invention is to provide an apparatus and a system for measuring air flow through a plurality of air filters whereby the apparatus and system may determine which of the plurality of air filters allows for the greatest air flow and/or least air restriction through the filter and may illustrate the air flow results and/or air velocity to a viewer.

Still another exemplary embodiment of the present invention is to provide apparatus and a system for measuring air flow through a plurality of air filters whereby the apparatus may have a clear plexi-glass housing to illustrate air movement in the common plenum to the viewer.

Another exemplary embodiment of the present invention is to provide an apparatus and a system for measuring air flow through plurality of air filters whereby the plurality of air filters may be of differing materials.

An exemplary embodiment of the present invention is to provide an apparatus and a system for measuring air flow through a plurality of air filters whereby the plurality of air filters may be constructed of different materials and whereby the air filters may restrict air flow in differing amounts.

Still another exemplary embodiment of the present invention is to provide an apparatus and a system for measuring air flow through a plurality of air filtration media whereby the apparatus may have a clear plexi-glass portion whereby a viewer may view the air flow from the container to the air media.

Yet another exemplary embodiment of the present invention is to provide an apparatus and a system for measuring air flow whereby the apparatus may have an air velocity meter attached thereto to measure the air velocity output from an air filter.

Still another exemplary embodiment of the present invention is to provide an apparatus and a system for measuring air flow through a plurality of air filters whereby the apparatus may have a plurality of air velocity meters associated with the plurality of air filters to measure the air velocity output from each of the plurality of air filters.

Another exemplary embodiment of the present invention is to provide an apparatus and a system for measuring air velocity through an air media whereby the apparatus may utilize wind meters to measure air flow through the air media.

Yet another exemplary embodiment of the present invention is to provide an apparatus and a system for measuring air velocity through an air filter that may be utilized in a vehicle such as a car, motorcycle, ATV, truck, boats, personal watercraft and the like.

Another exemplary embodiment of the present invention is to provide an apparatus and a system for measuring air velocity through an air filter that may be utilized to determine the best air flow and highest air velocity through a plurality of air filters.

Yet another exemplary embodiment of the present invention is to provide an apparatus and a system for measuring air velocity through a plurality of aftermarket OE or OE replacement air filters that may be utilized in a particular vehicle.

Still another exemplary embodiment of the present invention is to provide an apparatus and a system for measuring air velocity through a plurality of air filters whereby the apparatus may utilize a display means to illustrate the air filter with the greatest amount of air flow therethrough.

Still another exemplary embodiment of the present invention is to provide an apparatus and a system for measuring air velocity through a plurality of air filters whereby the apparatus may utilize a display means whereby the display means may be a plurality of gaseous colors to illustrate the greatest air flow through the air filters.

Yet another exemplary embodiment of the present invention is to provide an apparatus and a system for measuring air velocity through a plurality of air filters whereby the apparatus may utilize a display means whereby the display means may be a colored gas that is associated with each air filter whereby increased colored gas displays illustrate higher air flow through the air filters to the viewer.

In yet another exemplary embodiment of the present invention is to provide an apparatus and a system for measuring air velocity through a plurality of air filters whereby the apparatus may utilize a hinged top plate that may be incorporated into the apparatus to hold the filters in place.

Another exemplary embodiment of the present invention is to provide an apparatus and a system for measuring air velocity through an air media whereby the apparatus may utilize a hinged top plate that may be opened to allow for insertion and extraction of the air filters from the apparatus for display.

Still another exemplary embodiment of the present invention is to provide an apparatus and a system for measuring air velocity through an air filtration media whereby the apparatus may utilize a hinged top plate whereby the hinged top plate may have a plurality of air filter stations in spaced apart operation whereby a plurality of air filters may be inserted into the plurality of air filter stations.

Yet another exemplary embodiment of the present invention is to provide an apparatus and a system for measuring air velocity through an air filtration media whereby the apparatus may utilize a hinged top plate whereby the hinged top plate may have a plurality of air filter stations in spaced apart operation whereby a plurality of air filters may be inserted into the plurality of air filter stations and further wherein the plurality of air filters may be moved from one air filter station to another air filter station for illustrative purposes, and to illustrate substantially stable air flow velocity through the filter at any of the plurality of air filter stations.

Another exemplary embodiment of the present invention is to provide an apparatus and a system for measuring air velocity through an air media whereby the apparatus may utilize a plurality of air filter stations whereby an air filter is associated with each air filter station and whereby the air pressure exposure to each air filter station is substantially equal.

Still another exemplary embodiment of the present invention is to provide an apparatus and a system for measuring air velocity through an air media whereby the apparatus may utilize a plurality of air filter stations which are positioned on the top portion of the apparatus for illustrative purposes to the viewer.

Another exemplary embodiment of the present invention is to provide an apparatus and a system for measuring air velocity through an air media whereby the apparatus may utilize a plurality of air filter stations which may be positioned on the top portion of the apparatus and whereby the air filter stations may be positioned under a hinged top plate.

Yet another exemplary embodiment of the present invention is to provide an apparatus and a system for measuring air velocity through an air media whereby the apparatus may utilize a plurality of air filter stations positioned under a hinged top plate whereby filters may be placed into the filter stations and may be moved from one station to another station for illustration to a viewer.

Still another exemplary embodiment of the present invention is to provide an apparatus and a system for measuring air velocity through an air filtration media whereby the apparatus may utilize an air flow velocity device to measure the air flow velocity through an air media.

In yet another exemplary embodiment of the present invention, an apparatus and a system for measuring air velocity through an air media may be provided whereby the apparatus may utilize an air flow velocity device that may measure the air flow velocity through the air media wherein the air flow velocity device may be a wind meter.

Still a further exemplary embodiment of the present invention is to provide an apparatus and a system for measuring air velocity through an air media whereby the apparatus may utilize an air flow velocity device and further wherein the air flow velocity device may have a display means to illustrate the air velocity through the device.

Another exemplary embodiment of the present invention is to provide an apparatus and a system for measuring air velocity through an air media whereby the apparatus may utilize an air flow velocity device having an electronic display means to illustrate the air velocity and/or air restriction through the air filtration media.

In another exemplary embodiment of the present invention is to provide an apparatus and a system for measuring air velocity through an air media whereby the apparatus may utilize an air flow velocity device whereby the air flow velocity device may print a graphical representation of the air flow through the air media.

Still another exemplary embodiment of the present invention is to provide an apparatus and a system for measuring air velocity through an air filtration media whereby the apparatus may utilize an air flow velocity device whereby the air flow velocity device may provide illustration of the air velocity/restriction through the air media for presentation to the viewer.

Yet another exemplary embodiment of the present invention is to provide an apparatus and a system for measuring air velocity whereby the apparatus may contain and hold a plurality of different air filters for measurement of air flow through the plurality of air filters.

Still another exemplary embodiment of the present invention is to provide an apparatus and system for measuring air velocity through an air filtration media whereby the apparatus may have a plurality of air filters contained on the top portion of the apparatus where a viewer may observe the apparatus and associated plurality of air filters.

Yet another exemplary embodiment of the present invention is to provide an apparatus and a system for measuring the air velocity through an air media whereby the apparatus may have a hinged top plate whereby the hinged top plate may be located on the top portion of the apparatus.

Another exemplary embodiment of the present invention is to provide an apparatus and a system for measuring the air velocity through an air media whereby the apparatus may have a hinged plate whereby the hinged plate may be located on the sides of the apparatus for illustration to the viewer.

Yet another exemplary embodiment of the present invention is to provide an apparatus and a system for measuring air velocity through an air media whereby the apparatus may have a cabinet having a clear portion for illustration of air flow through the air filtration media.

Still another exemplary embodiment of the present invention is to provide an apparatus and a system for measuring air velocity through an air filter media whereby the apparatus may have a container means for holding the air velocity system whereby the container means may be constructed of metal.

Another exemplary embodiment of the present invention is to provide an apparatus and a system for measuring air velocity through an air media whereby the apparatus may have a container means for holding the air velocity system whereby the container means may be constructed of wood, plastic, metal or any suitable material for utilizing the air velocity system.

Yet another exemplary embodiment of the present invention is to provide an apparatus and a system for measuring air velocity through an air filtration media whereby the apparatus may have a gaseous blowing means whereby the blowing means thrusts air flow from one portion in the interior portion of the apparatus to a second portion in the apparatus.

Still another exemplary embodiment of the present invention is to provide an apparatus and a system for measuring air velocity through an air filtration media whereby the air velocity apparatus may have an airflow capacity from one cubic foot to ten thousand cubic feet, but in an exemplary embodiment may be at least 1500 cubic feet per minute through a plurality of air filtration media.

Another exemplary embodiment of the present invention is to provide an apparatus and a system for measuring air velocity through an air filtration media whereby the apparatus may have a container means including a blowing means wherein the blowers are positioned in the bottom portion of the container means.

Still another exemplary embodiment of the present invention is to provide an apparatus and a system for measuring air velocity through a plurality of air filters whereby the blowers employed by the apparatus may be constant and/or variable speed blowers.

Yet another exemplary embodiment of the present invention is to provide an apparatus and a system for measuring air velocity through a plurality of air medias whereby the apparatus may have a wind meter that is secured to the top plate so that the air velocity is measured at the same place above the air filtration medias.

Another exemplary embodiment of the present invention is to provide an apparatus and a system for measuring air velocity through a plurality of air filter media whereby a differential pressure gauge may be provided including but not limited to a liquid filled manometer, analog and/or digital differential pressure gauge that may be added to the common plenum.

Still another exemplary embodiment of the present invention is to provide an apparatus and a system for measuring air velocity through a plurality of air filters whereby the air flow differences in each air filter's discharge velocity may be measured with a wind velocity meter mounted above the air filter.

Another exemplary embodiment of the present invention is to provide an apparatus and a system for measuring air velocity through an air media whereby the apparatus may have a common plenum that ensures that the plurality of air filters will be subjected to the same differential pressure.

Yet another exemplary embodiment of the present invention is to provide an apparatus and system for measuring air velocity through a plurality of air filters whereby the apparatus may incorporate a plurality of display means to illustrate the air discharge velocity of the plurality of air filters.

Various objects, features, aspects and advantages of the present invention will become more apparent from the following detailed description of preferred embodiments of the invention, along with the accompanying drawings in which like numerals represent like components.

Additional features and advantages of the present invention are described herein, and will be apparent from the detailed description of the presently preferred embodiments and from the drawings.

DETAILED DESCRIPTION

Figure 1:
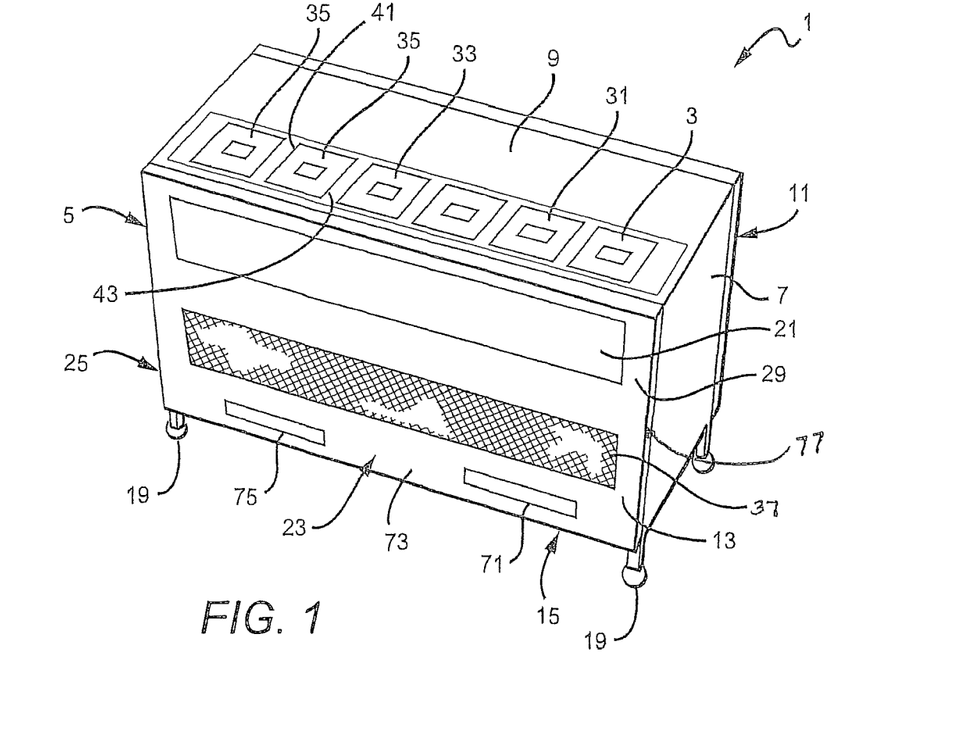
FIG. 1 is a front perspective view of the apparatus in an exemplary embodiment of the present invention.

Turning now to the drawings wherein elements are identified by numbers and like elements are identified by like numbers throughout the 5 figures, the invention is depicted in FIG. 1 and illustrates an air velocity apparatus 1 that may be utilized to illustrate air flow through an air filtration media 3.

Referring first to FIG. 1, an air velocity apparatus 1 is provided. The air velocity apparatus (hereinafter referred to as a device) may have a plurality of different configurations, but for illustrative purposes is shown in only a single embodiment for ease of description. Thereby, the device 1 may have a first side 5 and a second side 7. Additionally, the device 1 may have a front portion 13 and a rear portion 11. Moreover, the device 1 may further have a top portion 9 and a bottom portion 15. The device may also have wheels 19 attached to the bottom portion 15 of the device 1 for movement and relocation of the device 1 when desired for illustrative purposes. The wheels 19 may allow the device 1 to be moved from one location to another where the device may be used, installed and utilized for illustration to a plurality of different viewers (not shown).

As further illustrated in FIG. 1, the air velocity apparatus 1 may a viewable portion 21 in the front portion 13 of the device 1. In an exemplary embodiment, this viewable portion 21 may be constructed of plexi-glass. However, it should be understood that the viewable portion 21 may be constructed of any suitable transparent material that would allow the viewer to view the inside portion 23 of the container 25. Therefore, the viewable portion 21 may be constructed of glass, plastic, or any other transparent material. The preferred embodiment contemplates having this viewable portion 21 located at the top 29 of the front portion 13. However, the viewable portion 21 may encompass the entirety of the front portion 13. It should also be understood that the viewable portion 21 may be contained on the first side 5 and on the second side 7, and/or may be positioned on the back portion 11 of the device for illustration of the air velocity apparatus to the viewer.

FIG. 1 further illustrates the top portion 9 of the air velocity device 1 whereby the top portion has a hinge 29 attached to the top portion 9 of the device 1 whereby the hinge 29 attaches the top plate 31 to the top portion 9 of the device 1. The hinged top plate 31 may be incorporated into the device 1 to allow for insertion of independent air filtration media 33 into the device. In an exemplary embodiment, the air filtration media 33 is an air filter 35. The air filter 35 may be placed into an opening 37 in the top portion 9 of the device that may be specifically designed and constructed to allow for insertion of an air filter 35 into the opening 37. The opening 37 may be designed to accommodate a specifically sized air filter 35 and/or may be designed and constructed to accommodate a plurality of differently sized air filter 35. As further illustrated in FIG. 1, a second air filter 41 may also be accommodated into a second opening 43 in the top portion 9 of the device, whereby a second filter 41 may be inserted into the second opening 43 which is adjacent to the first opening 37. As with the first opening 37, the second opening 43 may be designed to accommodate a specifically sized second air filter 41 and/or may be designed to accommodate a different sized air filter.

Figure 2:
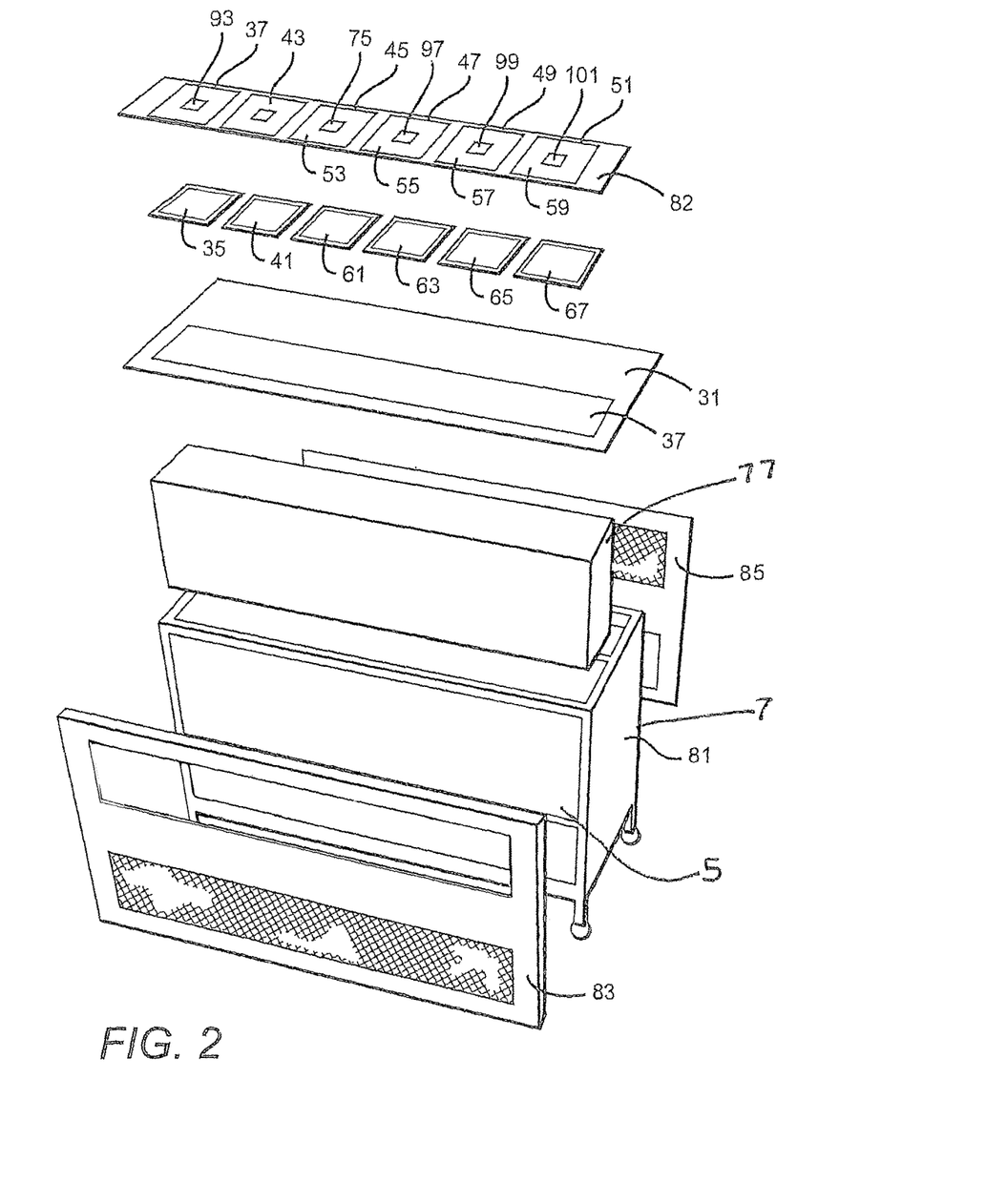
FIG. 2 is a disassembled front perspective view of the apparatus in an exemplary embodiment of the present invention.

As can be seen from FIGS. 1 and 2, the device 1 may also have a third position 45, a fourth position 47, a fifth position 49 and a sixth position 51, whereby the third, fourth, fifth and sixth positions 45, 47, 49 and 51 may have corresponding third, fourth, fifth and sixth openings 53, 55, 57 and 59, respectively, which may be adapted to accept a third, fourth, fifth and sixth air filter 61, 63, 65, and 67 respectively. Although in an exemplary embodiment, the present invention illustrates the use of six stations which may accommodate six air filters, the invention is not limited to this pre-set amount, and further is indicative of having exactly six stations to accommodate six air filters. The invention may be utilized for any number of air filters and can have substantially more or less than the illustrated six stations.

Additionally, FIG. 1 illustrates the blower 71 utilized to create air velocity through the air filter 37. As illustrated in FIG. 1, the blower 71 may be positioned at the bottom section 73 of the device 1. In an exemplary embodiment, the device 1 may use a first blower 71 and a second blower 75 whereby the two blowers 71, 75 may create the necessary air flow necessary to provide air velocity output through the air filter 37. This may be accomplished by providing a common plenum 77. The common plenum 77 may ensure that all of the filter 37 will be subject to the same differential pressure. The difference in filter restriction will cause any differences in air flow velocity through any respective filter 37.

FIG. 2 illustrates the air velocity device 1 in a disassembled state. As previously demonstrated, the device 1 may have a first side 5 and a second side 7 which is part of the frame 81 of the device. Additionally, the device 1 may have a front plate 83 and a rear plate 85 that may be removed from the frame 81 of the device 1. Additionally the top plate 31 is also illustrated having a plurality of air filter 35 and the accommodation portion 87 having a plurality of openings to accommodate the filter 35. As further illustrated in FIG. 2, the accommodation portion 87 may have a plurality of opening 37 thereon and may also have a first anemometer and/or wind meter 91 positioned thereon and further corresponding to the first opening 37 on the accommodation portion 87. Additionally, a second anemometer and/or wind meter 93 may be positioned on the accommodation portion 87 and further may correspond to the second opening 43 of the accommodation portion 87. In an exemplary embodiment, a third, fourth, fifth and sixth wind meter and/or anemometer 95, 97, 99 and 101 may also be positioned on the accommodation portion 87 and correspond to the third, fourth, fifth and sixth air filters 61, 63, 65, and 67.

Figure 3:
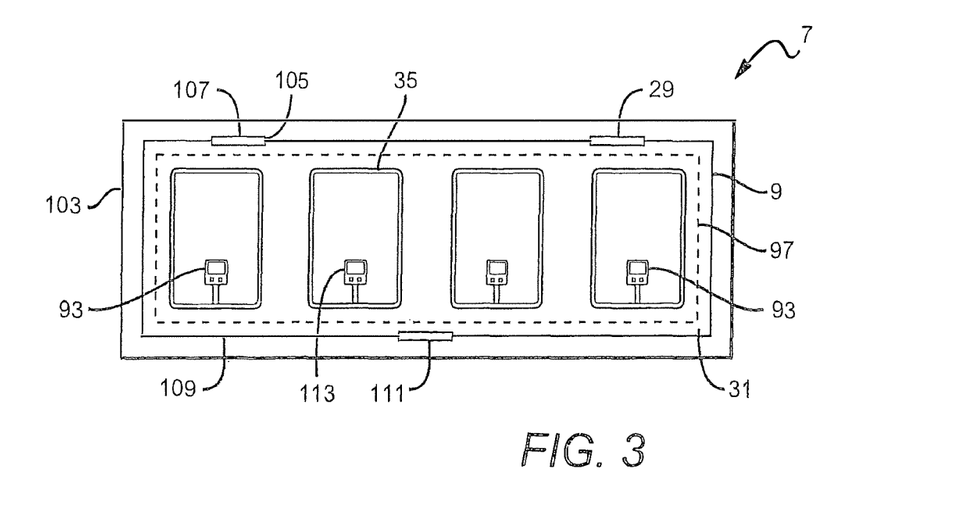
FIG. 3 is a top view of the apparatus for measuring air velocity in an exemplary embodiment of the present invention.

FIG. 3 illustrates a top view of the air velocity device 1. The top portion 9 of the device 1 may have a top plate 31 attached to the outside edge 103 of the top portion 9. The top plate 31 may be hinged to the outside edge 103 by the use of a connection means 105. In an exemplary embodiment, the connection means 105 is a hinge 29. In an embodiment, the air velocity device may have a first hinge 29 and a second hinge 107. However, it should be understood that any type of other connection means 105 such as adhesive, hook and fastener, snap fit and the like may be utilized to attach the top plate 31 to the outside edge 103 of the top portion 9 of the device 1. The front position 109 of the top plate may have a handle 111 to allow for pivoting of the top plate 31 relative to the top portion 9 of the device 1. Underneath the top plate 31 is the accommodation portion 87 which has the plurality of openings thereon for accommodation of a plurality of air filter 35. As can be seen in FIG. 3, the accommodation portion 87 of the device 1 may also have a plurality of wind meters and/or anemometer 93 attached thereto. The wind meters extend away from an inside edge 113 of the accommodation portion 87 and extend into the space 112 occupied by the opening and/or the positioned air filter 35. In an exemplary embodiment, the wind meters may be securely mounted to the top plate 31 so the air velocity that is measured is always measured at the same place above the filter 37 in the plurality of positions. The air filter 35 may be fitted onto the accommodation portion 87 whereby the accommodation portion 87 may be fitted to specified parameters to accommodate a specified sized air filter 35. A plurality of different air filter 35 may be utilized as illustrated in FIG. 3 whereby the wind meters are positioned on a second side 113 of the air filter to determine the air restriction through the plurality of air filter 35 and display to the viewer which air filter 35 allows the least restriction of air through the filter 35.

It should also be noted, that the air filter 35 may be inserted and extracted from the accommodating portion 87 and re-inserted into another location on the accommodation portion 87 to illustrate that each location will have a substantially similar air flow velocity, whereby no matter where the air filter 35 is located on the accommodation portion 87, the air velocity through the air filter should remain substantially constant.

Figure 4:
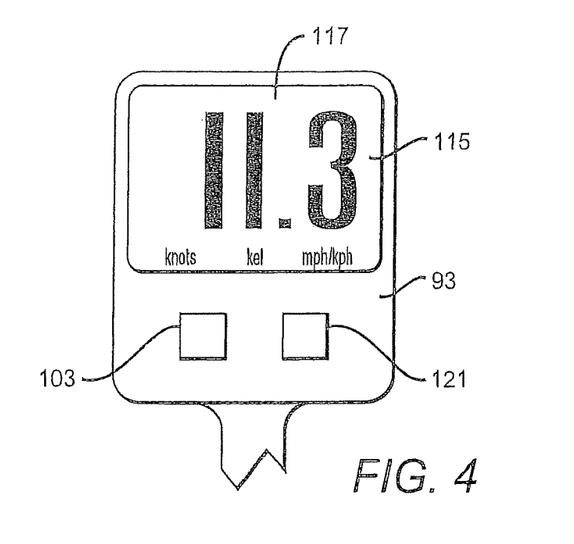
FIG. 4 is a top view of the anemometer and/or wind velocity meter in an exemplary embodiment of the present invention.

FIG. 4 illustrates the wind meters 93 associated with the accommodation portion 87 of the device 1. The wind meters 93 are located above the second side 113 of the air filter 35 whereby the unrestricted air flow through the filter 35 is analyzed by the wind meters 93. The wind meter 93 collects a sampling of the air flow through the filter 35 and displays the data collected to the viewer. In an exemplary embodiment, the wind meter may have a display means 115 whereby the user can easily determine how much air flow is allowed through the air filter 35. The display means 115 may be a LCD screen 117 that illustrates the air flow through the filter 35. In an exemplary embodiment, the wind meter analyzes and displays the air flow velocity in miles per hour. However, in another embodiment, the wind meter 93 may display the results of the air velocity through the air filter 35 in knots, kilometers per hour, or any other display of velocity pressure and/or airflow.

Additionally, the wind meter 93 may also have a first button 119 whereby the button may allow the viewer to view the results of the air restriction of each air filter 35 in a plurality of different capacities including miles per hour, kilometers per hour and the like. The wind meter may be adjusted to display the results based on the preference of the viewer. The wind meter may also have a second button 121 whereby the second button 121 may be utilized to reset the wind meter for further testing and demonstration of its corresponding air filter 35.

Figure 5:
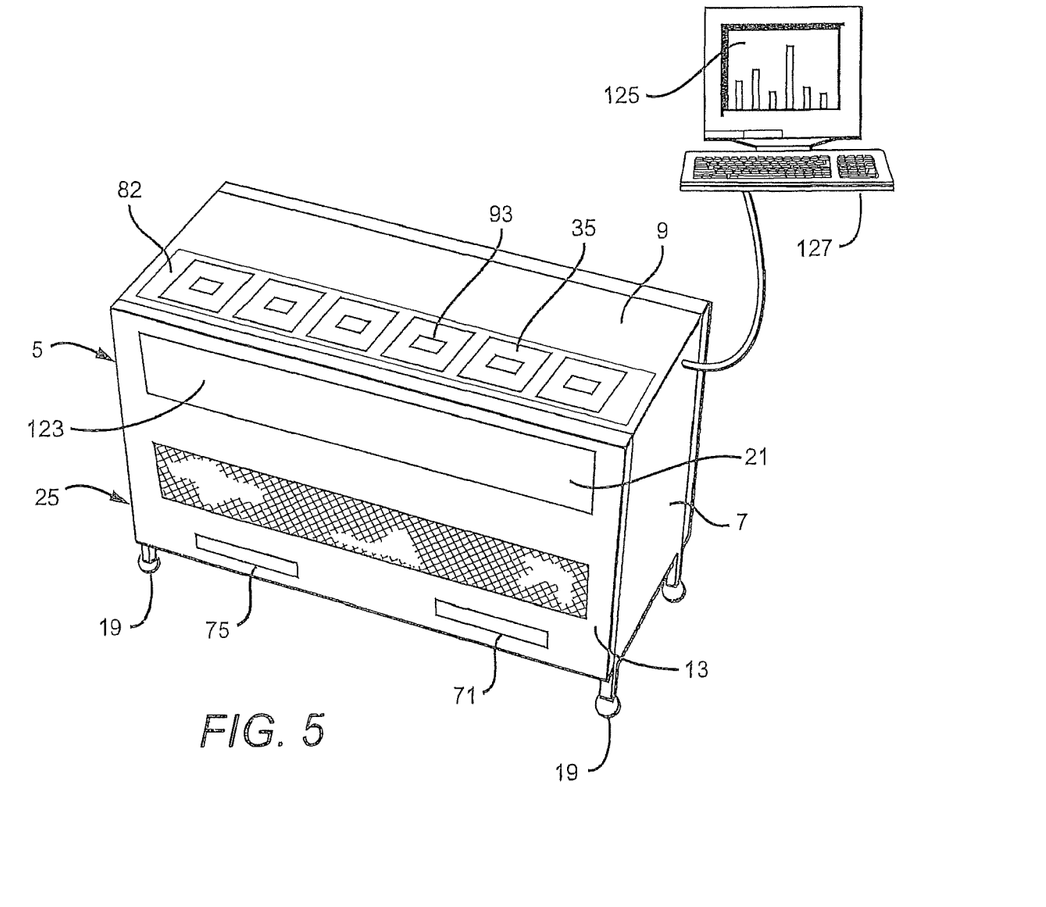
FIG. 5 is a front perspective view of the air velocity apparatus in an exemplary embodiment of the present invention.

FIG. 5 illustrates the device 1 whereby a plurality of different reporting and display means may be utilized to display the difference in air velocity between the plurality of air filter 35. In an exemplary embodiment, a plurality of colored gases 123 may be utilized to illustrate which of the plurality of air filters has the least amount of air flow restriction therebetween. The colored gases 123 may be utilized to illustrate visually to a viewer the air flow through the air filters. The greater amount of colored gas 123 that is viewable to an observer, the more air flow that is being allowed through the filter, thereby allowing the observer to determine which of the plurality of air filters is the most and/or least restrictive.

In another exemplary embodiment of the present invention, the device 1 and the plurality of wind meters may be connected to a periphery computation device 125. The periphery computation device 125 may be a computer 127. The computer 127 may receive statistical information from the device 1 wind meters and may use the data to graphically or statistically display the results to the viewer relating to which air filter 35 had the least and/or most amount of air restriction. The computer 127 could also show in graphical faun which air filter 35 had the best air flow therethrough. In an exemplary embodiment, the computer 127 may be connected to a printer (not shown) whereby a viewer may print the results of the air velocity device 1 whereby a viewer may be able to see which air filter 35 results in the least amount of air restriction therethrough.

Thus, specific embodiments and applications of a safety device system have been disclosed. It should be apparent, however, to those skilled in the art that many more modifications besides those already described are possible without departing from the inventive concepts herein. The inventive subject matter, therefore, is not to be restricted except in the spirit of the appended claims. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for measuring air flow through a filtration media, the apparatus comprising:
   a container means having at least a side, and a top and bottom portion;
   an accommodation portion whereby the accommodation portion has at least one opening thereon for accommodating an air filtration media;
   one or more blowers for directing air flow through the air filtration media; and
   at least one anemometer to measure the air flow through the air filtration media.

2. The apparatus of claim 1 wherein the accommodation portion holds a plurality of air filtration media.

3. The apparatus of claim 1 further comprising:
   a top plate hinged to the top portion of the container means wherein the top plate may extend away and allow access to the accommodation portion.

4. The apparatus of claim 1 wherein the apparatus has a plurality of anemometers connected to the accommodation portion.

5. The apparatus of claim 1 wherein the apparatus has a plurality of anemometers whereby the anemometers collect air flow data from above the air filtration media and report the results to a viewer.

6. The apparatus of claim 1 wherein the air filtration media is a vehicle air filter.

7. The apparatus of claim 1 wherein the container means has at least one transparent portion whereby a viewer may observe the interior portion of the container means.

8. The apparatus of claim 1 further comprising:
   a common plenum to subject the air filtration media to the same differential pressure.

9. The apparatus of claim 1 wherein a front portion and the top portion of the container means is constructed of clear Plexi-Glass™.

10. The apparatus of claim 1 wherein the anemometer measures the total velocity exiting a plurality of air filtration media and displays the results of the total velocity on a display means.

11. The apparatus of claim 1 wherein the anemometer is positioned above the air filtration media whereby upon exiting the air filtration media, air velocity data is collected by the anemometer to determine velocity of exiting air from the air filtration media.

12. The apparatus of claim 1 wherein a plurality of anemometers are positioned in substantially the same position on the accommodation portion such that each anemometer is subject to a set of parameters including only the air flow velocity leaving each air filtration media.

13. The apparatus of claim 1 wherein the accommodation portion has a plurality of openings thereon to accommodate a plurality of air filtration media whereby the air filtration media is removably placed into the openings and further wherein the air filtration media may be moved from one opening on the accommodation portion to another opening thereon.

14. A system of measuring air velocity, the system comprising:
a container means having at least a side, and a top and bottom portion whereby the side and the top portion are transparent;
a plurality of spaced apart openings on the top portion of the container means;
one or more blowers contained within the container means to create an air flow;
a plurality of air filter media placed in the plurality of spaced apart opening on the top portion of the container means; and
a plurality of wind meters associated with each of the plurality of air filters.

15. The system of claim 14 further comprising:
a common plenum contained within the container means to subject the air filters to the same differential pressure.

16. The system of claim 14 wherein the wind meters are positioned above the air filters whereby upon exiting the air filters, air velocity data is collected by the wind meters to determine velocity of exiting air from the air filters.

17. The system of claim 14 wherein the wind meters display the results of measured air velocity through the air filters.

18. The system of claim 14 wherein the wind meters display the results of the measured air velocity through the air filters utilizing a display means.

19. The system of claim 14 wherein the system may be connected to a terminal whereby the terminal graphically displays and prints a copy of the collected air velocity data from each of the air filters.

20. The system of claim 14 wherein the plurality of openings on the top portion of the container means accommodates a plurality of air filters whereby the air filters are removably placed into the plurality of openings and further wherein the air filters are interchangeable with any of the plurality of openings.

* * * * *